United States Patent
Kim et al.

(10) Patent No.: US 10,766,772 B2
(45) Date of Patent: Sep. 8, 2020

(54) METHOD FOR PREPARING THREE-DIMENSIONAL GRAPHENE STRUCTURE AND ENERGY STORAGE DEVICE

(71) Applicants: ELECTRONICS AND TELECOMMUNICATIONS RESEARCH INSTITUTE, Daejeon (KR); Gachon University of Industry-Academic Cooperation Foundation, Seongnam-si, Gyeonggi-do (KR)

(72) Inventors: Tae-Young Kim, Seoul (KR); In-Kyu You, Gongju-si (KR); Bit Na Kim, Daejeon (KR); In Gyoo Kim, Daejeon (KR); Sung-Hoon Jung, Yongin-si (KR); Seung-Jun Park, Suwon-si (KR)

(73) Assignees: Electronics and Telecommunications Research Institute, Daejeon (KR); Gachon University of Industry-Academic Cooperation Foundation, Seongnam-si, Gyeonggi-do (KR)

(*) Notice: Subject to any disclaimer, the term of this patent is extended or adjusted under 35 U.S.C. 154(b) by 408 days.

(21) Appl. No.: 15/803,162

(22) Filed: Nov. 3, 2017

(65) Prior Publication Data

US 2018/0127276 A1    May 10, 2018

(30) Foreign Application Priority Data

Nov. 4, 2016  (KR) .................. 10-2016-0146380
Mar. 15, 2017  (KR) .................. 10-2017-0032717

(51) Int. Cl.
  *C01B 32/198* (2017.01)
  *H01M 4/62* (2006.01)
  (Continued)

(52) U.S. Cl.
  CPC .......... *C01B 32/198* (2017.08); *B01D 71/021* (2013.01); *B01J 35/02* (2013.01);
  (Continued)

(58) Field of Classification Search
  CPC ... C01B 32/198; C01B 32/184; C01B 32/182; C01B 2204/00; C01B 2204/02;
  (Continued)

(56) References Cited

U.S. PATENT DOCUMENTS 9,129,882 B2  9/2015  Jeon et al.
9,133,035 B2  9/2015  Yun et al.
(Continued)

FOREIGN PATENT DOCUMENTS

KR     2016-0123542 A     10/2016

OTHER PUBLICATIONS

Li Wang et al., "A green and simple strategy to prepare graphene foam-like three dimensional porous carbon/Ni nanoparticles for glucose sensing", Sensors and Actuators B: Chemical, 239, Aug. 2, 2016, p. 172-179.

*Primary Examiner* — Daniel C. McCracken
(74) *Attorney, Agent, or Firm* — Rabin & Berdo, P.C.

(57) ABSTRACT

A method for preparing a three-dimensional graphene structure, and an energy storage device are provided, the method including forming a graphene precursor by heating a carbohydrate and a gas generator, forming a graphene structure having a cavity therein by carbonizing the graphene precursor, and forming nanopores in the graphene structure, wherein the nanopores pass through an outer surface and an inner surface of the graphene structure, and are connected with the cavity.

15 Claims, 6 Drawing Sheets

(51) Int. Cl.
| | |
|---|---|
| *B01J 35/02* | (2006.01) |
| *C01B 32/184* | (2017.01) |
| *B01D 71/02* | (2006.01) |
| *H01M 4/36* | (2006.01) |
| *H01G 11/86* | (2013.01) |
| *H01G 11/24* | (2013.01) |
| *H01G 11/32* | (2013.01) |
| *H01G 11/34* | (2013.01) |

(52) U.S. Cl.
CPC .......... *C01B 32/184* (2017.08); *H01G 11/24* (2013.01); *H01G 11/32* (2013.01); *H01G 11/34* (2013.01); *H01G 11/86* (2013.01); *H01M 4/366* (2013.01); *H01M 4/625* (2013.01); *C01P 2004/30* (2013.01)

(58) Field of Classification Search
CPC .......... C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; H01G 11/34; H01G 11/32; H01G 11/24; H01G 11/86; H01M 4/366; H01M 4/625; B01D 71/021; B01J 35/02; C01P 2004/30

See application file for complete search history.

(56) References Cited

U.S. PATENT DOCUMENTS

| | | |
|---|---|---|
| 9,249,026 B2 | 2/2016 | Zhao et al. |
| 2014/0027677 A1* | 1/2014 | Lipka .................. H01B 1/24 252/502 |
| 2016/0130149 A1 | 5/2016 | Shankman |

* cited by examiner

US 10,766,772 B2

METHOD FOR PREPARING THREE-DIMENSIONAL GRAPHENE STRUCTURE AND ENERGY STORAGE DEVICE

CROSS-REFERENCE TO RELATED APPLICATIONS

This U.S. non-provisional patent application claims priority under 35 U.S.C. § 119 of Korean Patent Application Nos. 10-2016-0146380, filed on Nov. 4, 2016, and 10-2017-0032717, filed on Mar. 15, 2017, the entire contents of which are hereby incorporated by reference.

BACKGROUND

The present disclosure relates to a graphene structure, and more particularly, to a method for preparing a three-dimensional graphene structure.

Recently, there has been much interest in an energy storage device such as a supercapacitor. The energy storage device may include an electrolyte disposed between electrodes. The contact area between the electrolyte and the electrodes must be increased in order to increase the capacitance of the energy storage device. Accordingly, a variety of research is being conducted for increasing the surface area of the electrode.

Graphene is an allotrope of carbon in the form of a two-dimensional, atomic-scale, hexagonal lattice in which one atom forms each vertex. The graphene has a high electrical conductivity and a high specific surface area, and thus may be used as an electrode material in the energy storage devices such as the supercapacitors. However, existing processes for preparing the graphene from graphite are complex due to requiring multiple process steps etc., and thus have the limitation of high cost. Moreover, such processes also cause environmental issues, such as the generation of industrial waste materials, during production. In addition, due to the limitation in which, during the process for preparing the graphene from graphite, graphene layers are stacked such that the specific surface area is reduced, there is a limitation in which the performance that is expected when using the graphene as the electrode in the supercapacitor is not achieved.

SUMMARY

The present disclosure provides an economical three-dimensional graphene structure that uses a biomass rather than graphite as a precursor, and a method for preparing the same.

The present disclosure also provides an energy storage device having increased capacitance.

A method for preparing a three-dimensional graphene structure and an energy storage device are provided. According to an embodiment of the inventive concept, the method for preparing a three-dimensional graphene structure includes forming a graphene precursor by heating a carbohydrate and a gas generator; forming a graphene structure having a cavity therein by carbonizing the graphene precursor; and forming nanopores in the graphene structure, wherein the nanopores pass through an outer surface and an inner surface of the graphene structure, and are connected with the cavity.

In embodiments, the forming of the nanopores may include forming a mixture by adding an activating agent to the graphene structure; and heat treating the mixture.

In embodiments, the activating agent may include at least one among potassium hydroxide (KOH), sodium hydroxide, phosphoric acid ($H_3PO_4$), and zinc chloride ($ZnCl_2$).

In embodiments, the heat treatment of the mixture may be carried out at temperature conditions of about 600° C. to 1000° C.

In embodiments, the forming of the nanopores may further include providing a reaction gas on the graphene structure at temperature conditions of 600° C. to 1000° C.

In embodiments, the forming of the nanopores may include providing a reaction gas on the graphene structure.

In embodiments, the reaction gas may be provided on the graphene structure at temperature conditions of 600° C. to 1000° C.; and the reaction gas may include carbon dioxide ($CO_2$).

In embodiments, the graphene precursor may be carried out at temperature conditions of about 800° C. to 1400° C.

In embodiments, the graphene structure includes a plurality of graphenes stacked.

In embodiments, the cavity may have an average diameter of about 1 μm to 1 mm; and the nanopores may have an average diameter of about nm 0.1 to 50 nm.

According to an embodiment of the inventive concept, an energy storage device includes a first electrode structure including a first current collector and a first graphene structure disposed on the first current collector, in which the first graphene structure has a first cavity therein, and first nanopores pass though an outer surface and an inner surface of the first graphene structure to be connected with the first cavity; a second electrode structure spaced apart from the first electrode structure and including a second current collector and a second graphene structure disposed on the second current collector, in which the second graphene structure has a second cavity therein, and second nanopores pass though an outer surface and an inner surface of the second graphene structure to be connected with the second cavity; an electrolyte interposed between the first electrode structure and the second electrode structure; and a separation film in the electrolyte, wherein the electrolyte is provided in the first cavity, the first nanopores, the second cavity, and the second nanopores.

In embodiments, the electrolyte may physically contact the inner surface and the outer surface of the first graphene structure, and the inner surface and the outer surface of the second graphene structure.

In embodiments, the first graphene structure may be electrically connected with the first current collector

DETAILED DESCRIPTION

Figure 1:
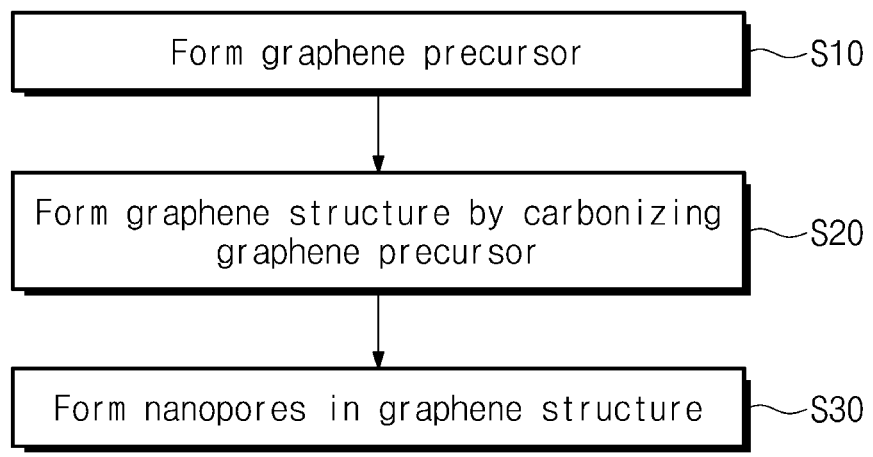
FIG. 1 is a flow chart illustrating a method for preparing a three-dimensional graphene structure according to embodiments of the inventive concept.

Exemplary embodiments of the inventive concept will be described below in more detail with reference to the accompanying drawings, in order to provide sufficient understanding of the features and effects of the inventive concept. The inventive concept may, however, be embodied in different forms and modified in various ways, and should not be construed as limited to the embodiments set forth herein. Rather, these embodiments are provided so that this disclosure will be thorough and complete, and will fully convey the scope of the inventive concept to those skilled in the art. It will be understood by those skilled in the art that the inventive concept may be carried out in an appropriate environment.

The terminology used herein is for the purpose of describing particular embodiments only and is not intended to be limiting of the invention. As used herein, singular forms are intended to include their plural forms as well, unless the context clearly indicates otherwise. The terms 'comprises' and/or 'comprising', when used in this specification, specify the presence of stated components, steps, operations, and/or elements, but do not preclude the presence or addition of one or more other components, steps, operations, and/or elements thereof.

In the specification, when a film (or layer) is referred to as being on another film (or layer), or a substrate, it can be directly on the other film (or layer) or substrate, or a third film (or layer) may be interposed therebetween.

It will be understood that, although the terms first, second, third, etc. may be used herein to describe various regions, films (or layers), etc., these regions, films (or layers), etc. should not be limited by these terms. These terms are only used to distinguish one region, film (or layer), etc. from another region, film (or layer), etc. Thus, a first film discussed below could be termed a second film. The embodiments described herein also include complementary embodiments thereof. Like reference numerals refer to like elements throughout.

Unless otherwise defined, all terms used in the embodiments of the inventive concept may be construed as having the same meaning as commonly understood by one of ordinary skill in the art to which the invention belongs.

Hereinafter, description is given of a three-dimensional graphene structure and a method for preparing the same according to embodiments of the inventive concept.

Figure 2A:
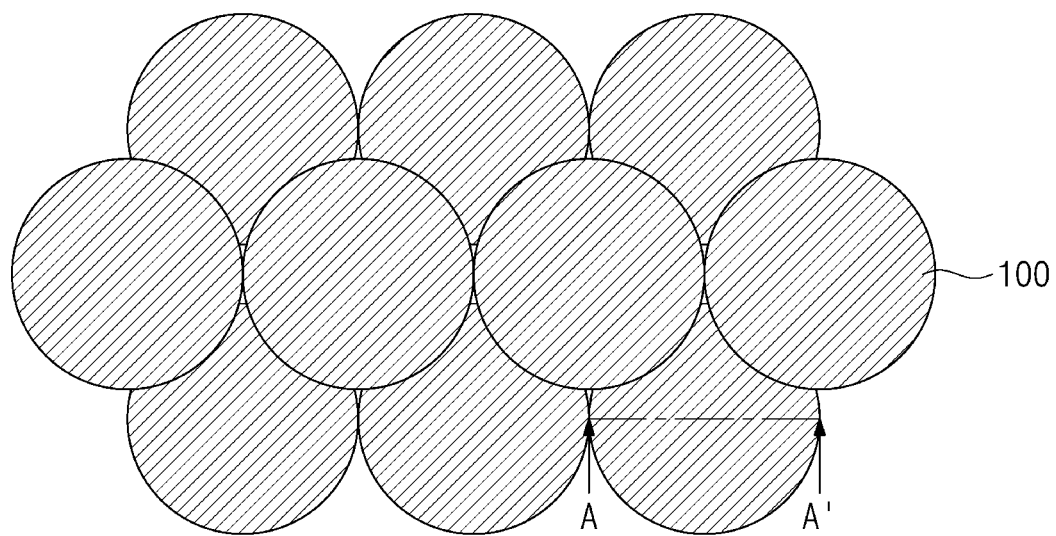
FIGS. 2A and 3A are plan views illustrating a method for preparing a three-dimensional graphene structure according to an embodiment of the inventive concept.
Figure 2B:
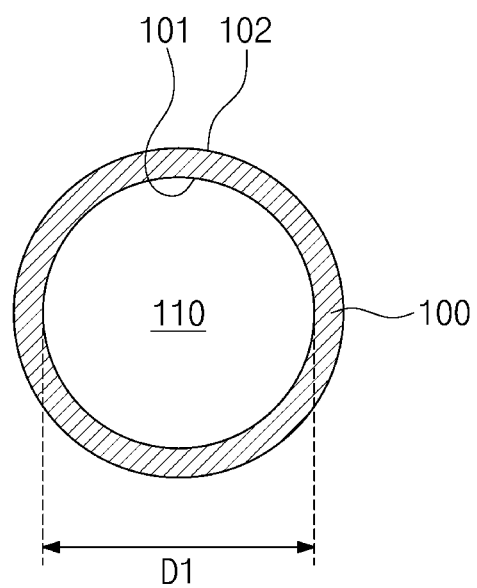
FIG. 2B is a cross-sectional view along line A-A' in FIG. 2A.
Figure 3A:
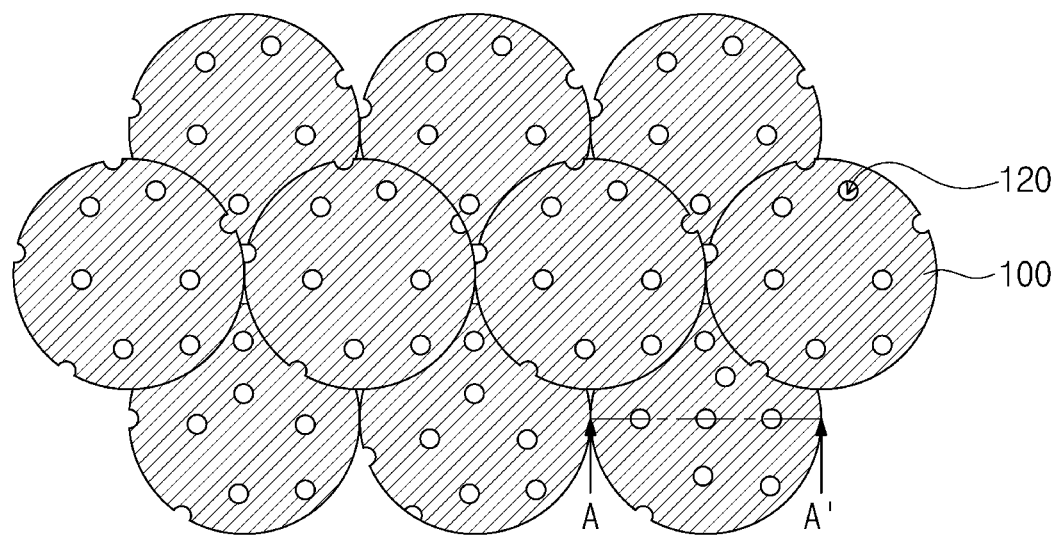
Figure 3B:
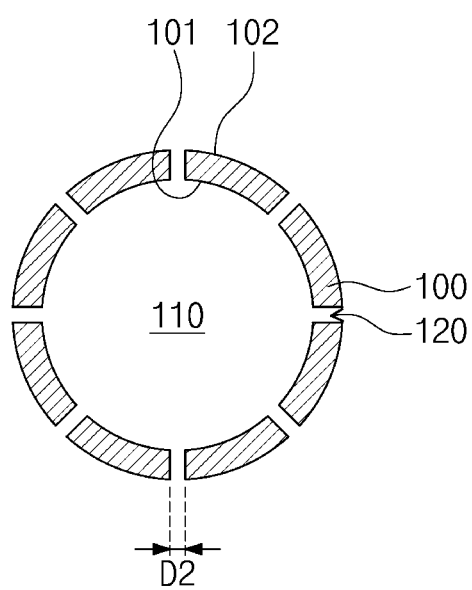
FIG. 3B is a cross-sectional view along line A-A' in FIG. 3A.

FIG. 1 is a flow chart illustrating a method for preparing a three-dimensional graphene structure according to embodiments of the inventive concept. FIGS. 2A and 3A are plan views illustrating a method for preparing a three-dimensional graphene structure according to an embodiment of the inventive concept. FIG. 2B is a cross-sectional view along line A-A' in FIG. 2A. FIG. 3B is a cross-sectional view along line A-A' in FIG. 3A.

Referring to FIGS. 1, 2A, and 2B, a carbohydrate and a gas generator may be heat treated to form a graphene precursor (not shown) (S10). The carbohydrate may include, for example, glucose, starch, galactose, maltose, xylose, cellulose, lactose, fructose, amylose, allose, altrose, gulose, idose, mannose, talose, and combinations thereof.

The carbohydrate may be derived from a biomass. The gas generator may include at least one among ammonium chloride ($NH_4Cl$), ammonium carbonate ($(NH_4)_2CO_3$), and melamine ($C_3H_6N_6$). The gas generator may be in a liquid or solid state. The carbohydrate and the gas generator may be provided inside a reactor.

The carbohydrate and the gas generator may be heat treated by heating the reactor. The carbohydrate may be polymerized by the heat treatment to thereby form the graphene precursor (not shown). The graphene precursor may have a three-dimensional structure. The graphene precursor may have, for example, a polyhedral or spherical shape. The gas generator may be heat treated to generate a gas. A cavity may be formed in the graphene precursor by the gas. For example, the graphene precursor may include a polymer such as melanoidin, but is not limited thereto.

The heat treatment of the carbohydrate and the gas generator may be carried out at temperature conditions of about 250° C. to 300° C. The carbohydrate and the gas generator may be heated to about 250° C. to 300° C. at a rate of about 1 15° C./minute to 15° C./minute. The graphene precursor may not be formed when the rate of heating is slower than about 1° C./minute.

The graphene precursor may be carbonized to form a graphene structure 100 (S20). The carbonization of the graphene precursor may include heat treatment of the graphene precursor. The graphene precursor may be carbonized by using the heat treatment to remove hydrogen and oxygen from the graphene precursor. The carbonization of the graphene precursor may be carried out at temperature conditions of about 800° C. to 1400° C. The graphene structure 100 may not be formed when the heat treatment is carried out at temperatures below about 800° C. The graphene structure 100 may be formed in an excessively distorted form when the heat treatment is performed at temperatures above about 1400° C. The carbonization of the graphene precursor may be carried out under an inert gas atmosphere. The inert gas may include argon gas or nitrogen gas.

The graphene structure 100 may have a three-dimensional structure. For example, the graphene structure 100 may be of a form having a spherical cavity.

The graphene structure 100 may have a form that is identical to or different from the graphene precursor. The graphene structure 100 may include the cavity 110 therein. For example, the cavity 110 in the graphene structure 100 may have an average diameter D1 of about 1 µm to 1 mm. The graphene structure 100 may have an inner surface 101 and an outer surface 102. The inner surface 101 of the graphene structure 100 may be oriented toward the cavity 110. The outer surface 102 of the graphene structure 100 may face the inner surface 101.

The graphene structure 100 may include a single layer of the graphene or multiple layers of the graphene stacked. For example, the graphene structure 100 may be formed by forming a film in which the single layer of the graphene surrounds the cavity 110. In another example, the graphene structure 100 may be formed by forming a film in which the multiple layers of the graphene define the cavity 110. In this case, the graphenes may be interposed between the inner surface 101 and the outer surface 102 of the graphene structure 100, and have a stacked structure. A plurality of the graphene structures 100 may be provided. The plurality of the graphene structures 100 may be connected to each other. Hereinafter, for conciseness of description, a single graphene structure 100 is described.

Referring to FIGS. 1, 3A, and 3B, nanopores 120 may be formed in the graphene structure 100 (S30). The nanopores 120 may pass through the outer surface 102 and the inner surface 101 of the graphene structure 100. The nanopores 120 may have an average diameter D2 of about 0.1 nm to 50 nm. The nanopores 120 may be connected with the cavity 110 in the graphene structure 100. The formation of the nanopores 120 may increase the surface area of the graphene structure 100. The surface area of the graphene structure 100 may be substantially the same as or greater the sum of the surface areas of the outer surface 102 and inner surface 101 of the graphene structure 100. For example, the graphene structure 100 may have a specific surface area of about 1500 $m^2/g$ to 3000 $m^2/g$.

According to an embodiment, an activating agent may be used to form the nanopores 120. For example, the activating agent may be added to the graphene structure 100 to form a mixture. The activating agent may be in a solution state. The activating agent may include at least one among potassium hydroxide, sodium hydroxide, phosphoric acid ($H_3PO_4$), and zinc chloride ($ZnCl_2$). Here, the weight ratio of the graphene structure 100 to the activating agent may be about 1:1 to 1:10. The mixture may be heat treated. The heat treatment of the mixture may be carried out under an inert gas atmosphere. In the heat treatment process, the activating agent may react with the graphene structure 100 such that a portion of the graphene structure 100 is removed. Thereby, the nanopores 120 may be formed in the graphene structure 100. The heat treatment of the mixture may be carried out at temperature conditions of at least about 600° C., specifically about 600° C. to 1000° C. The nanopores 120 may not be formed, or a small number of the nanopores 120 may be formed, when the heat treatment of the mixture is carried out at temperatures below about 600° C. In this case, the specific surface area of the graphene structure 100 after the heat treatment may not be sufficiently large.

According to another embodiment, a reaction gas for an activation reaction may be used to form the nanopores 120. To achieve this, a gas mixture including the reaction gas for an activation reaction and an inert gas may be prepared. The reaction gas may include carbon dioxide. The formation of the nanopores 120 may be carried out at temperature conditions of about 600° C. to 1000° C. For example, the graphene structure 100 may be provided inside a chamber (not shown), and the temperature of the chamber may be set to about 600° C. to 1000° C. The formation of the nanopores 120 may take place inside the same chamber as the carbonization process described with reference to FIGS. 2A and 2B. The gas mixture may be supplied into the chamber, and thereby provided on the graphene structure 100. The reaction gas may remove a portion of the graphene structure 100 by reacting with the graphene structure 100. The specific surface area of the graphene structure 100 may be small when the formation process of the nanopores 120 is carried out at a temperature below about 600° C. In the formation process of the nanopores 120, the reaction gas may be about 2.0 vol % to 33.3 vol % of the gas mixture. The graphene structure 100 may be excessively removed when the reaction gas exceeds about 33.3 vol % of the gas mixture. The nanopores 120 may not be formed, or the number or size of the nanopores 120 may be insufficient, when the reaction gas is less than 2.0 vol % of the gas mixture.

According to still another embodiment, a reaction solution and a reaction gas may be used to form the nanopores 120. For example, after the graphene structure 100 reacts with the reaction solution, the graphene structure 100 may be provided inside the chamber. A gas mixture may be provided inside the chamber. The gas mixture may include the reaction gas. Reactions between the graphene structure 100 and the reaction gas and between the graphene structure 100 and the reaction solution may be carried out by the same methods as described above.

Figure 4:
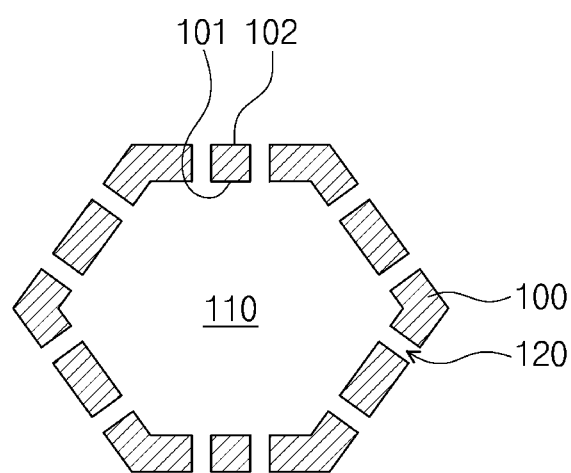
FIG. 4 is a cross-sectional view illustrating a three-dimensional graphene structure according to another embodiment.

FIG. 4 is a cross-sectional view illustrating a three-dimensional graphene structure according to another embodiment.

Referring to FIG. 4, the graphene structure 100 may have the shape of a polyhedron. For example, the graphene structure 100 may have the shape of a decahedron or a dodecahedron. Faces of the graphene structure 100 may have the shapes of polygons. Cross sections of the graphene structure 100 may be variously shaped. The nanopores 120 may pass through the graphene structure 100, and be connected with the cavity 110 in the graphene structure 100. The graphene structure 100 may be formed by the same method as described with reference to FIGS. 1 to 3B.

Hereinafter, description is given of an energy storage device according to an embodiment.

Figure 5:
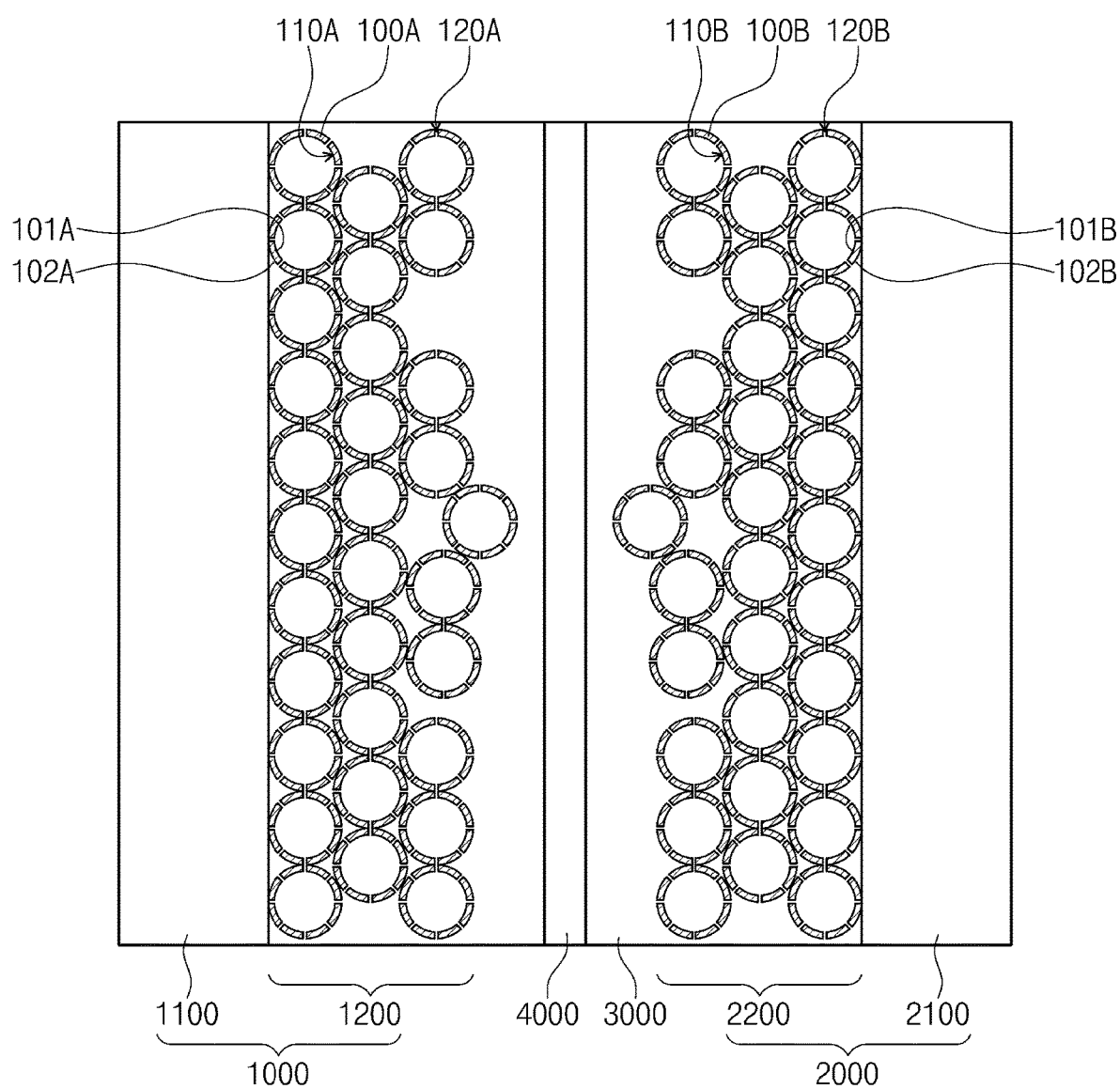
FIG. 5 is a cross-sectional view illustrating an energy storage device according to an embodiment.

FIG. 5 is a cross-sectional view illustrating an energy storage device according to an embodiment. Hereinafter, descriptions given above are not repeated.

Referring to FIG. 5, an energy storage device 1 may include a first electrode structure 1000, an electrolyte 3000, a separation film 4000, and a second electrode structure 2000. The energy storage device 1 may function as a supercapacitor. The first electrode structure 1000 may include a first current collector 1100 and a first electrode 1200. The first current collector 1100 may include a metal. The first electrode 1200 may be disposed on the first current collector 1100. The first electrode 1200 may be electrically connected with the first current collector 1100. The first electrode 1200 may include a first graphene structure 100A. The first graphene structure 100A may be formed using the same method as described with reference to FIGS. 1 to 3B. The first graphene structure 100A may have substantially the same structure as described in the example of FIGS. 3A and 3B or the example of FIGS. 4A and 4B. The first graphene structure 100A may have a first cavity 110A. First nanopores 120A may pass through an inner surface 101 and an outer surface 102 of the first graphene structure 100A. The first nanopores 120A may be connected with the first cavity 110A in the first graphene structure 100A.

The second electrode structure 2000 may be spaced apart from the first electrode structure 1000. The second electrode structure 2000 may include a second current collector 2100 and a second electrode 2200. The second current collector 2100 may include a metal. The second graphene structure 100B may be the same as the graphene structure 100 described with reference to FIGS. 3A and 3B or FIGS. 4A and 4B. The second graphene structure 100B may be formed using the same method as described with reference to FIGS. 1 to 3B. The second graphene structure 100B may have a second cavity 110B. Second nanopores 120B may be formed in the second graphene structure 100B. The second nanopores 120B may pass through an inner surface 101B and an outer surface 102B of the second graphene structure 100B. The second nanopores 120B may be connected with the second cavity 110B in the second graphene structure 100B. The second electrode 2200 may face the first electrode 1200.

The electrolyte 3000 may be interposed between the first electrode structure 1000 and the second electrode structure 2000. The electrolyte 3000 may be filled in between the first electrode 1200 and the second electrode 2200. For example, the electrolyte 3000 may include metal ions. The electrolyte 3000 may be provided into the first cavity 110A in the first graphene structure 100A through the first nanopores 120A. The electrolyte 3000 may contact the inner surface 101A and the outer surface 102A of the first graphene structure 100A. The contact area between the electrolyte 3000 and the first graphene structure 100A may be increased to enhance the electrical properties of the energy storage device 1. The electrolyte 3000 may be provided into the second cavity 110B in the second graphene structure 100B through the second nanopores 120B. The electrolyte 3000 may contact the inner surface 101B and the outer surface 102B of the second graphene structure 100B. The contact area between the electrolyte 3000 and the second graphene structure 100B may be increased to enhance the electrical properties of the energy storage device 1.

The separation film 4000 may be disposed in the electrolyte 3000. The electrolyte 3000 may pass through the separation film 4000.

Hereinafter, the preparation of graphene structures according to embodiments of the inventive concept, and results of evaluating the properties of the graphene structure, are described.

Preparation of Graphene Structures

COMPARATIVE EXAMPLE

Glucose and ammonium chloride were heat treated at 250° C. to form a graphene precursor. The graphene precursor was heat treated at 1100° C. to form a graphene structure.

EXPERIMENTAL EXAMPLE 1

A graphene structure was formed by the same method as in the Comparative Example. Afterwards, the graphene structure 100 was reacted with an activating agent to form nanopores in the graphene structure. Here, potassium hydroxide was used as the activating agent.

EXPERIMENTAL EXAMPLE 2

A graphene structure was formed by the same method as in the Comparative Example. Afterwards, a gas mixture of carbon dioxide gas and an inert gas was provided on the graphene structure to form nanopores.

EXPERIMENTAL EXAMPLE 3

A graphene structure was formed by the same method as in Experimental Example 1. Afterwards, the graphene structure was placed inside a chamber, and a gas mixture of carbon dioxide gas and an inert gas was supplied into the chamber.

Table 1 displays results of measuring the specific surface areas of the Comparative Example and Experimental Examples 1 to 3.

TABLE 1

|  | Comparative Example | Experimental Example 1 | Experimental Example 2 | Experimental Example 3 |
|---|---|---|---|---|
| Specific surface area (m²/g) | 1300 | 2200 | 1800 | 2400 |

Referring to Table 1 along with FIGS. 3A and 3B, it is observed that the specific surface areas of Experimental Examples 1 to 3 are larger than that of the Comparative Example. In the case of Experimental Examples 1 to 3, the nanopores 120 are formed inside the graphene structure 100, and thus may be connected with the cavity 110 in the graphene structure 100. The specific surface area of the graphene structure 100 may include the outer surface 102 and the inner surface 101 of the graphene structure 100. Thus, it is observed that the specific surface area of the graphene structure 100 of the Experimental Examples has been increased.

Figure 6:
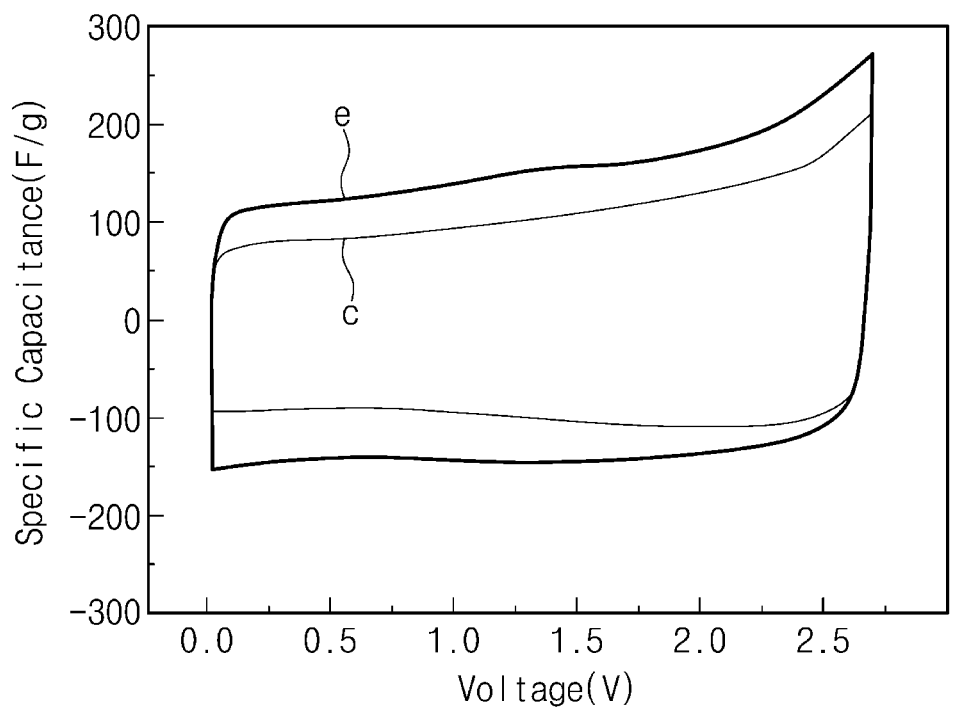
FIG. 6 is a graph evaluating the capacitance properties of the Comparative Example and Experimental Example 1.

FIG. 6 is a graph evaluating the capacitance properties of the Comparative Example and Experimental Example 1. The capacitance properties were evaluated by cyclic voltammetry using a 1 M electrolyte. An acetonitrile solution having tetraethylammonium tetrafluoroborate dissolved therein was used as the electrolyte.

Referring to both FIG. 6 and Table 1, it is observed that the capacitance of Experimental Example 1 (e) is greater than that of the Comparative Example (c). The total capacitance of the Comparative Example (c) was calculated to be 104 F/g, and the total capacitance of Experimental Example 1 (e) was calculated to be 154 F/g. Here, the total capacitance may indicate the area of the graph in FIG. 6. Since the specific surface area of the graphene structure 100 of Experimental Example 1 (e) is greater than the specific surface area of the graphene structure 100 of the Comparative Example (c), the contact area between the graphene structure 100 of Experimental Example 1 (e) and the electrolyte may be greater than the contact area between the graphene structure 100 of the Comparative Example (c) and the electrolyte. Thus, the capacitance of the Experimental Example 1 (e) may be further enhanced.

According to an embodiment of the inventive concept, nanopores may be formed in a graphene structure and be connected with a cavity in the graphene structure. Consequently, the surface area and reaction area of the graphene structure may be increased.

An electrode in an energy storage device may include a graphene structure. The contact area between the graphene structure and an electrolyte may be increased such that the capacity of the energy storage device is enhanced.

Although the exemplary embodiments of the present invention have been described, it is understood that the present invention should not be limited to these exemplary embodiments. Rather, the present invention may be embodied in various forms, modified in various ways, and used in various environments within the spirit and scope of the present invention. It is to be understood that the scope of the appended claims also includes embodiments in different forms.

What is claimed is:

1. A method for preparing a three-dimensional graphene structure, the method comprising:
    forming a graphene precursor by heating a carbohydrate and a gas generator;
    forming a graphene structure having a cavity therein by carbonizing the graphene precursor, the cavity having an average diameter of about 1 μm to 1 mm; and
    forming nanopores in the graphene structure, wherein the nanopores pass through an outer surface and an inner surface of the graphene structure and are connected with the cavity.

2. The method of claim 1, wherein the forming of the nanopores includes:
    forming a mixture by adding an activating agent to the graphene structure; and
    heat treating the mixture.

3. The method of claim 2, wherein the activating agent includes at least one among potassium hydroxide (KOH), sodium hydroxide, phosphoric acid ($H_3PO_4$), and zinc chloride ($ZnCl_2$).

4. The method of claim 2, wherein the heat treatment of the mixture is carried out at temperature conditions of about 600° C. to 1000° C.

5. The method of claim 2, wherein the forming of the nanopores further includes providing a reaction gas on the graphene structure at temperature conditions of 600° C. to 1000° C.

6. The method of claim 1, wherein the forming of the nanopores includes providing a reaction gas on the graphene structure.

7. The method of claim 6, wherein:
the reaction gas is provided on the graphene structure at temperature conditions of 600° C. to 1000° C.; and
the reaction gas includes carbon dioxide ($CO_2$).

8. The method of claim 6, wherein the carbonization of the graphene precursor is carried out at temperature conditions of about 800° C. to 1400° C.

9. The method of claim 1, wherein the graphene structure includes a plurality of graphenes stacked.

10. The method of claim 1, wherein
the nanopores have an average diameter of about 0.1 nm to 50 nm.

11. An energy storage device comprising:
a first electrode structure including a first current collector and a first graphene structure disposed on the first current collector, in which the first graphene structure has a first cavity therein, the first cavity having an average diameter of about 1 μm to 1 mm, and first nanopores extending through an outer surface and an inner surface of the first graphene structure to be connected with the first cavity;
a second electrode structure spaced apart from the first electrode structure and including a second current collector and a second graphene structure disposed on the second current collector, wherein the second graphene structure has a second cavity therein, the second cavity having an average diameter of about 1 μm to 1 mm, and second nanopores extending through an outer surface and an inner surface of the second graphene structure to be connected with the second cavity;
an electrolyte interposed between the first electrode structure and the second electrode structure; and
a separation film in the electrolyte,
wherein the electrolyte is provided in the first cavity, the first nanopores, the second cavity, and the second nanopores.

12. The energy storage device of claim 11, wherein the electrolyte physically contacts the inner surface and the outer surface of the first graphene structure, and the inner surface and the outer surface of the second graphene structure.

13. The energy storage device of claim 11, wherein the first graphene structure is electrically connected with the first current collector.

14. The method of claims 1, wherein forming the graphene precursor is performed by heating the carbohydrate and the gas generator at a temperature of about 250° C. to 300° C.

15. The method of claims 1, wherein the graphene structure has a specific surface area of about 1800 $m^2$/g to 3000 $m^2$/g.

* * * * *